United States Patent
Sultenfuss et al.

(10) Patent No.: US 10,289,829 B2
(45) Date of Patent: May 14, 2019

(54) MULTI-FUNCTION INFORMATION HANDLING SYSTEM BAY SUPPORTING WIRELESS SECURITY ACCESS

(71) Applicant: Dell Products L.P., Round Rock, TX (US)

(72) Inventors: Andrew T. Sultenfuss, Leander, TX (US); Randall E. Juenger, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 15/151,771

(22) Filed: May 11, 2016

(65) Prior Publication Data

US 2017/0329951 A1  Nov. 16, 2017

(51) Int. Cl.
*G06F 21/35* (2013.01)
*G06K 7/10* (2006.01)

(52) U.S. Cl.
CPC ......... *G06F 21/35* (2013.01); *G06K 7/10297* (2013.01); *G06K 7/10366* (2013.01)

(58) Field of Classification Search
CPC ............... G06F 21/35; G06K 7/10297; G06K 7/10366; G06K 19/0723; G06K 19/07749; H04B 5/00
See application file for complete search history.

(56) References Cited

PUBLICATIONS

Merkert, Sr., Smart Card Readers and FIPS 201—Logical and Physical Access, 2006.*
SCM Smart Card Readers Writers Terminals Special, Apr. 2015.*
Your Contact in a Contactless World, Cardzgroup, 2014.*
Basic Overview of Smart Card Technology, Allegion, 2013.*
Mohammed et al., Smart Card Technology: Past, Present, and Future, 2004.*
Dell, Dell ControlVault, Locking Down Your Users' Credentials, 2008, http://www.dell.com/downloads/global/products/latit/en/dell_contolvault_specsheet.pdf.

* cited by examiner

*Primary Examiner* — Minh Dinh
(74) *Attorney, Agent, or Firm* — Terrile, Cannatti & Chambers; Stephen A. Terrile (57) ABSTRACT

A system, method, and computer-readable medium are disclosed for supporting wireless security access via a multi-function information handling system bay. In certain embodiments, the wireless security access is provided via a security access device configured to fit within the multi-function information handling system. In certain embodiments, the security access device includes a narrow antenna with one full length side in conjunction with high gain and an alignment bar for best matching provides the security access device with the ability to include a near field communications (NFC) type transmitter within the security access device.

10 Claims, 6 Drawing Sheets

MULTI-FUNCTION INFORMATION HANDLING SYSTEM BAY SUPPORTING WIRELESS SECURITY ACCESS

BACKGROUND OF THE INVENTION

Field of the Invention

The present invention relates to information handling systems. More specifically, embodiments of the invention relate to a supporting wireless security access via a multi-function information handling system bay.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems, such as mobile information handling systems, with wireless security functionality to provide ready access and security via the information handling system.

SUMMARY OF THE INVENTION

A system and method are disclosed for supporting wireless security access via a multi-function information handling system bay. In certain embodiments, the wireless security access is provided via a security access device configured to fit within the multi-function information handling system. In certain embodiments, the security access device includes a narrow antenna with one full length side in conjunction with high gain and an alignment bar for best matching provides the security access device with the ability to include a near field communications (NFC) type transmitter within the security access device. In certain embodiments, the NFC type transmitter provides good gain and repeatability. In certain embodiments, the security access device is associated with a bumper bar. In certain embodiments, the bumper bar is positioned within the security access device. In certain embodiments, the bumper bar is positioned on the chassis of the information handling system to provide the security access device with easy alignment. In certain embodiments, the narrow antenna includes a coil. In certain embodiments, the coil includes a right angle to enhance the gain of the antenna. In certain embodiments, the right angle of the coil is configured to provide a maximum gain to a badge reading side of the security access device while provide a coil return path which is non-interfering. In certain embodiments, the coil return path is folded back into the security access device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure appreciate that providing an information handling system with wireless security access is an important feature for secure information handling systems such as those used in end user computing (EUC) type commercial applications. Various aspects of the present disclosure appreciate that desktop type information handling systems and other form factors often include standardized bays designed for easily adding components such as hard disk drives, digital video disk (DVD) players and I/O port modules. These standardized bays often have fixed shapes and dimensions. Presently wireless card readers such as those which make use of Near Field Communications (NFC) type communications have shapes that are not aligned for these standardized ports. For the purposes of this disclosure, NFC type communications may be defined a means of establishing communication between two devices where by bringing the devices into close proximity (typically 0-5 centimeters) Aspects of the present disclosure appreciate that component modularity is a desirable aspect for common chassis and stock keeping unit (SKU) management.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
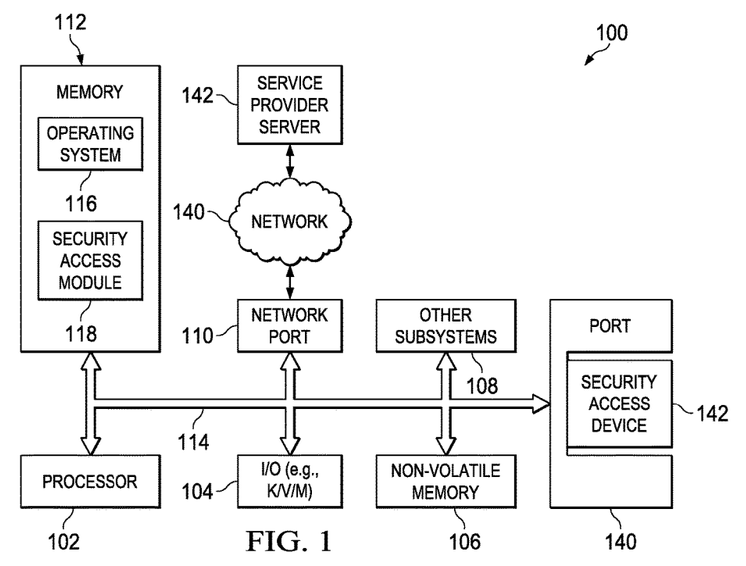
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. In certain embodiments, the memory 106 stores an operating system 116 as well as a security access module 118. In certain embodiments, the information handling system further includes a multi-function component bay 140 as well as a wireless security access device 142. In certain embodiments, the multi-function component bay 140 corresponds to a standard 5.25" type bay. In certain embodiments, the multi-function component bay 140 corresponds to a slim line ODD type bay (having dimensions of approximately (i.e., +/−10%) 0.35"×5"×5").

The security access device 142 supports wireless security access via a multi-function component bay 140. In certain embodiments, the wireless security access is provided via the security access device 142 configured to fit within the multi-function component bay 140. In certain embodiments, the security access device 142 includes a narrow antenna with one full length side in conjunction with high gain and an alignment bar for best matching provides the security access device with the ability to include a near field communications (NFC) type transmitter within the security access device. In certain embodiments, the NFC type transmitter provides includes good gain and repeatability. In certain embodiments, the security access device 142 is associated with a bumper bar. In certain embodiments, the bumper bar includes a feature that protrudes from the security access device to enable a user to place a corner of a radio frequency identification (RFID) tag in proper alignment with the antenna of the security access device. In certain embodiments, the bumper bar is positioned within the security access device. In certain embodiments, the bumper bar is positioned on the chassis of the information handling system to provide the security access device with easy alignment. In certain embodiments, the narrow antenna includes a coil. In certain embodiments, the coil includes a right angle to enhance the gain of the antenna. In certain embodiments, the right angle of the coil is configured to provide a maximum gain to a badge reading side of the security access device while provide a coil return path which is non-interfering. In certain embodiments, the coil return path is folded back into the security access device.

Figure 2:
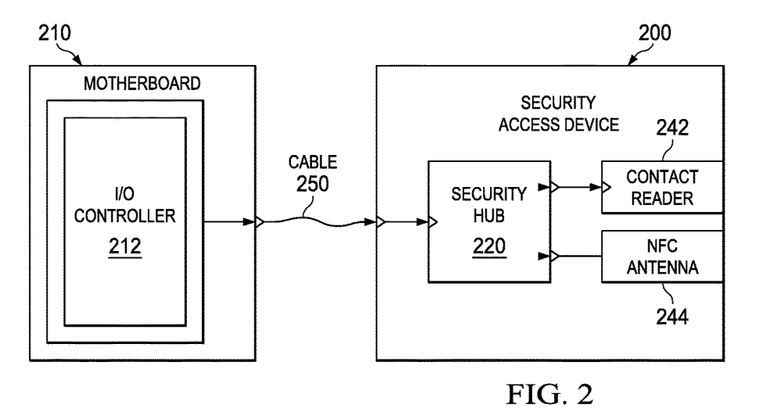
FIG. 2 shows a block diagram of a security access device environment.

Referring to FIG. 2, a block diagram of a security access device environment 200 is shown. The security access device environment includes an information handling system motherboard 210 as well as a security access device 220. In certain embodiments, the security access device 200 includes some or all of the functionality of the security access device 142. The information handling system motherboard 210 includes a I/O controller circuit 212. In certain embodiments, the I/O controller circuit 212 includes an integrated USB host controller. In certain embodiments, with a USB Host controller, the cable comprises a USB type cable such as a USB 2.0 type cable. In certain embodiments, the I/O controller circuit 212 includes a PCIe Root Hub controller. In certain embodiments, with a PCIe Root Hub controller, the cable comprises a PCIe type cable such as a mini serial attached small computer system interface (SCSI) hard drive (SASHD) type cable.

The security access device 220 includes a security access device enclosure 230. The security access device 220 also includes a security hub circuit 240 as well as a contact reader portion 242 and an antenna portion 244. In certain embodiments the security hub circuit 240 corresponds to a universal security hub (USH) printed circuit board assembly (PCBA). In certain embodiments, the USH supports a Near Field Communications (NFC) radio interface and provides the control to read the card, parse the data and return to the host application via the USB (or other) host interface. In certain embodiments, the security device enclosure 230 conforms to a slim line form factor. In certain embodiments, the slim line form factor fits in a volume of s slim line Optical Disk Drive (ODD) type form factor. In certain embodiments, the security device enclosure 230 is adaptable to conform to a Flex Bay form factor. In certain embodiments, the security device enclosure is adaptable to conform to a 5.25 drive form factor.

The security access device environment 200 further includes a security access device cable 250 for coupling information handling system motherboard 210 and the security access device 220. In certain embodiments, the security access device cable includes a USB2 type connector for coupling to the information handling system motherboard 220. In certain embodiments, the security access device cable 210 is coupled to a FlexBay Header connection on the information handling system motherboard 210 for connection with a FlexBay multi-function component bay. In certain embodiments, a FlexBay includes a multifunction component bay which is capable of accepting a variety of modules. These Flexbays can accept many different peripherals. The overall size of the FlexBay is slightly smaller than a 5.25" component bay. In certain embodiments, the security access device cable 250 provides the path via which power is provided to the security access device 220.

In certain embodiments, the security access device environment 200 includes a hardware based security solution for storing user credentials such as the security credentials provided by a card reader included within the card reader portion 242 as well as by a contactless reader (e.g., via the antenna portion 244). In certain embodiments, the hardware based security solution comprises a control vault security solution available from Dell, Inc. In certain embodiments, the security access device environment includes a software stack which provides native security features such as login, etc. as well as data protection (DP) features and provide Pre Boot Authorization (PBA) support for smart security cards. In certain embodiments, the software stack is included either in part or in whole within the operating system 116.

Figure 3:
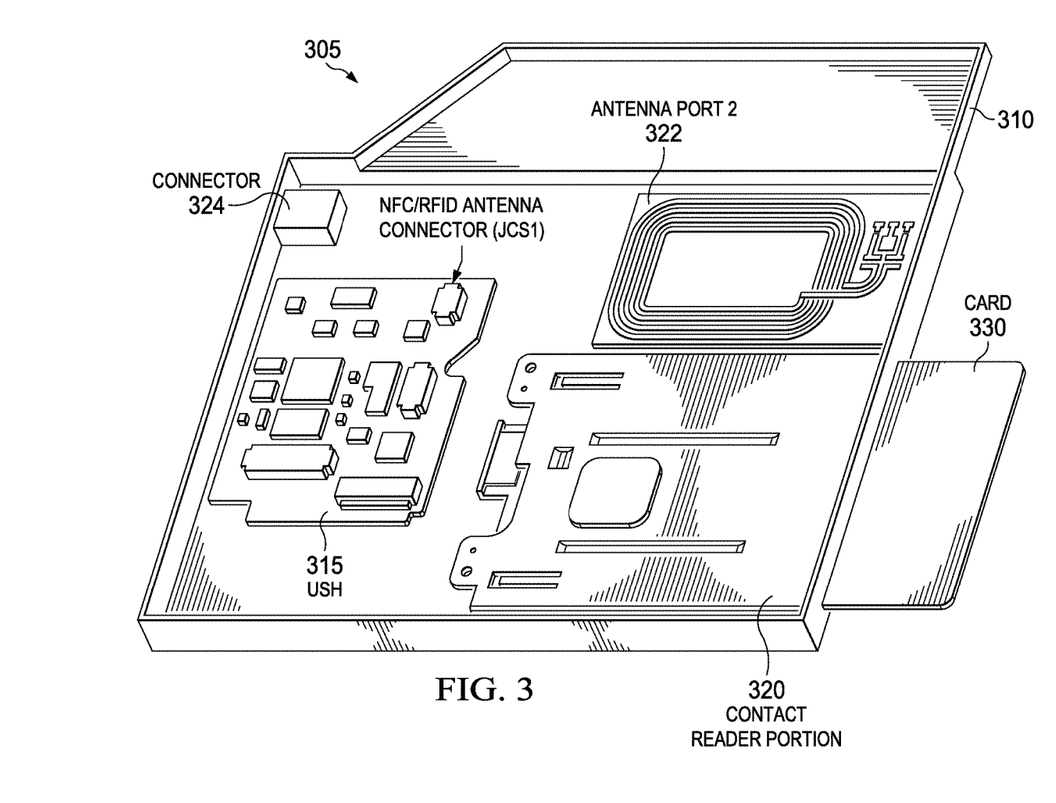
FIG. 3 shows an example physical layout of a security access device.

FIG. 3 shows an example physical layout of a security access device 305. More specifically, the components of security access device 305 are included within a security access device enclosure 310 which conforms to a slim line ODD form factor. The security access device enclosure 310 may be mounted within the information handling system 100 in either a vertical or horizontal orientation. In certain embodiments, the security access device enclosure 310 can be attached to an optional bracket which would then enable the security access device 305 to be mounted within a larger form factor such as a 5.25" Half Height (HH) bay form factor (e.g., approximately (i.e., +/−10%) 1.625").

The layout includes the universal security hub circuit 315 which performs universal security hub operations as well as a contact reader portion 320 and an antenna portion 322. The antenna portion includes a NFC/RFID antenna 324. Such a physical layout provides a security access device 305 which uses an antenna within the antenna portion 322 which is substantially smaller than conventional antennas (e.g., about a third the size (+/−10%)) used in NFC/RFID type operations.

The layout further includes a connector 324 for coupling the security access device 305 to the motherboard 210 of the information handling system 100. In certain embodiments, the universal security hub circuit 315 includes a connector for coupling the universal security hub circuit 315 to a contact reader from the contact reader portion 320. In certain embodiments, the universal security hub circuit 315 includes a connector for coupling the universal security hub circuit 315 to an antenna from the antenna portion 322. In certain embodiments, the connector for coupling the universal security hub circuit 315 to the antenna includes a NFC/RFID type connector. In certain embodiments, the universal security hub circuit 315 includes a connector for coupling the universal security hub circuit 315 to the connector 324. A security access card 330 may be inserted into a contact reader which is included within the contact reader portion 320.

In certain embodiments, the layout 300 includes mounting locations for mounting a printed circuit board 340 of the universal security hub circuit 315 as well as for the contact reader portion 320 and the antenna portion 322 (i.e., a contactless card reader portion). In certain embodiments, some or all of the enclosure 310 is made of plastic to prevent antenna performance degradation. In certain embodiments, portions of the enclosure 310 contiguous with the antenna portion 324 are made of plastic.

Figure 4:
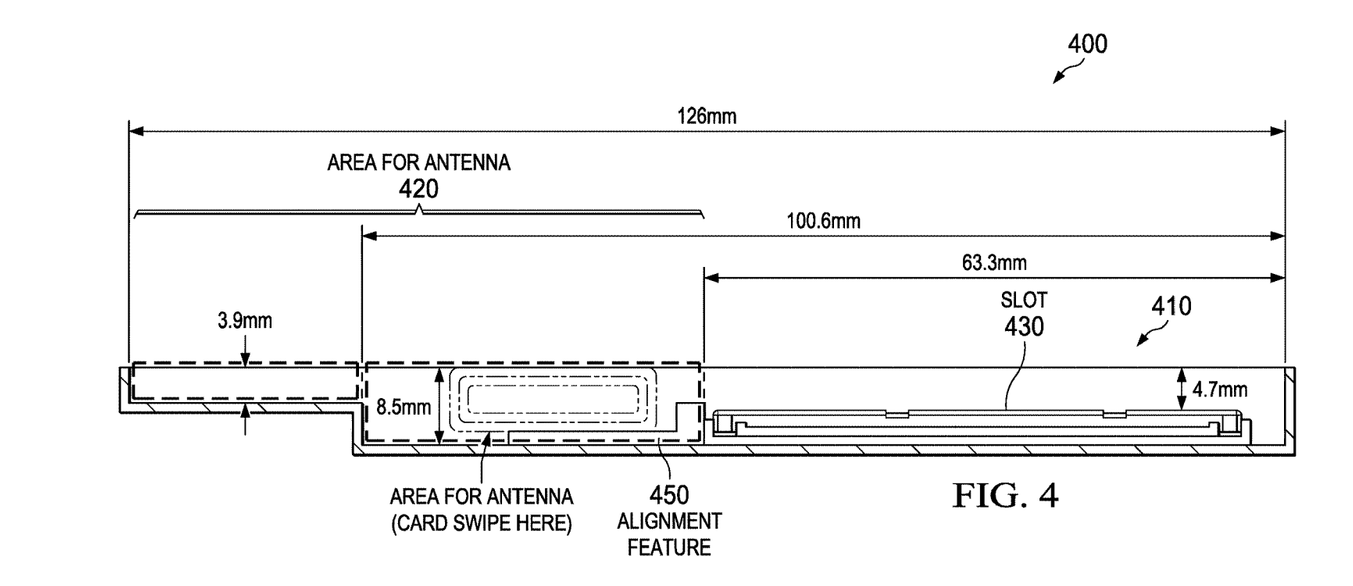
FIG. 4 shows a front view of a security access device enclosure.
Figure 5:
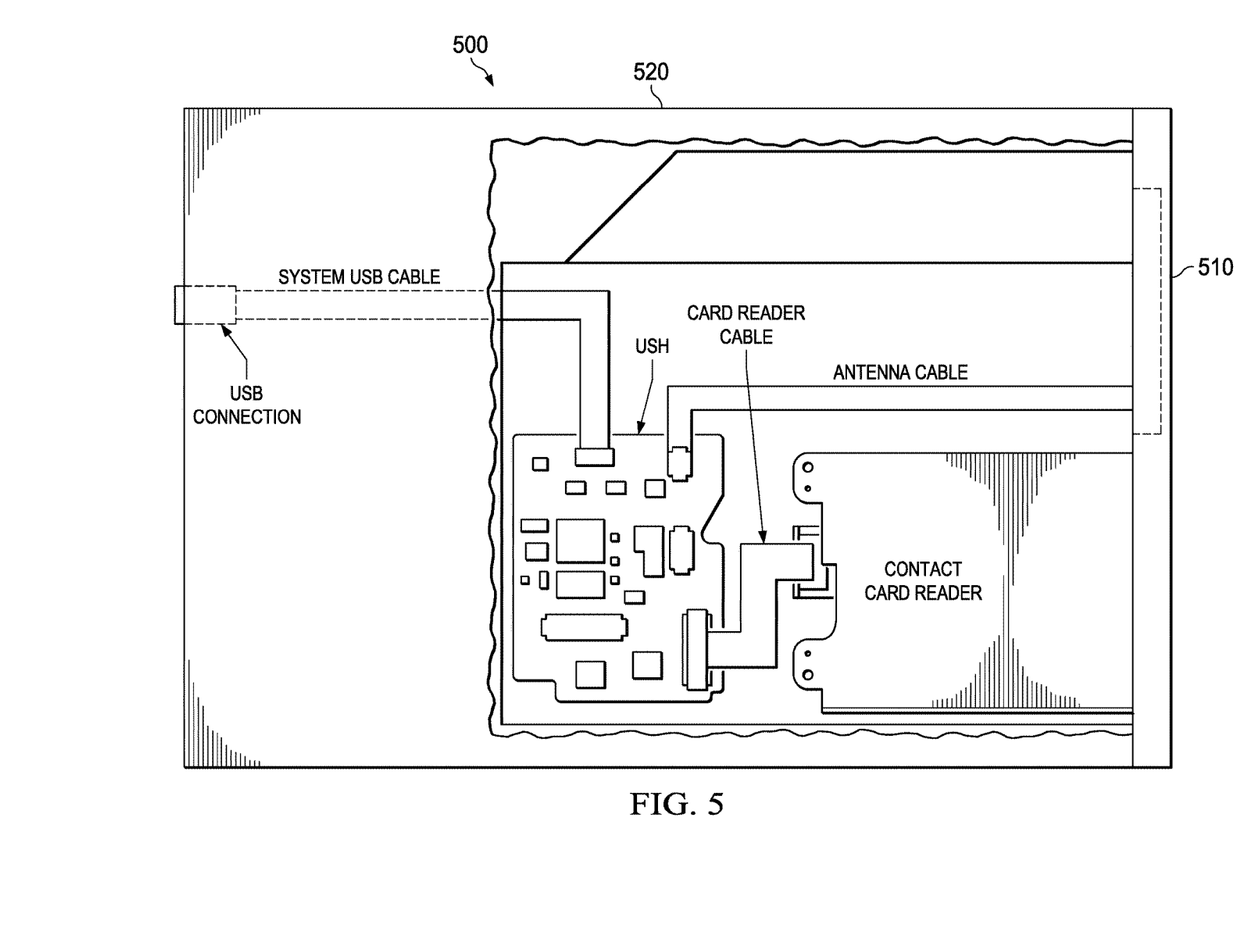
FIG. 5 shows a schematic view of a security access device adapted for a half height multi-function component bay.
Figure 6A:
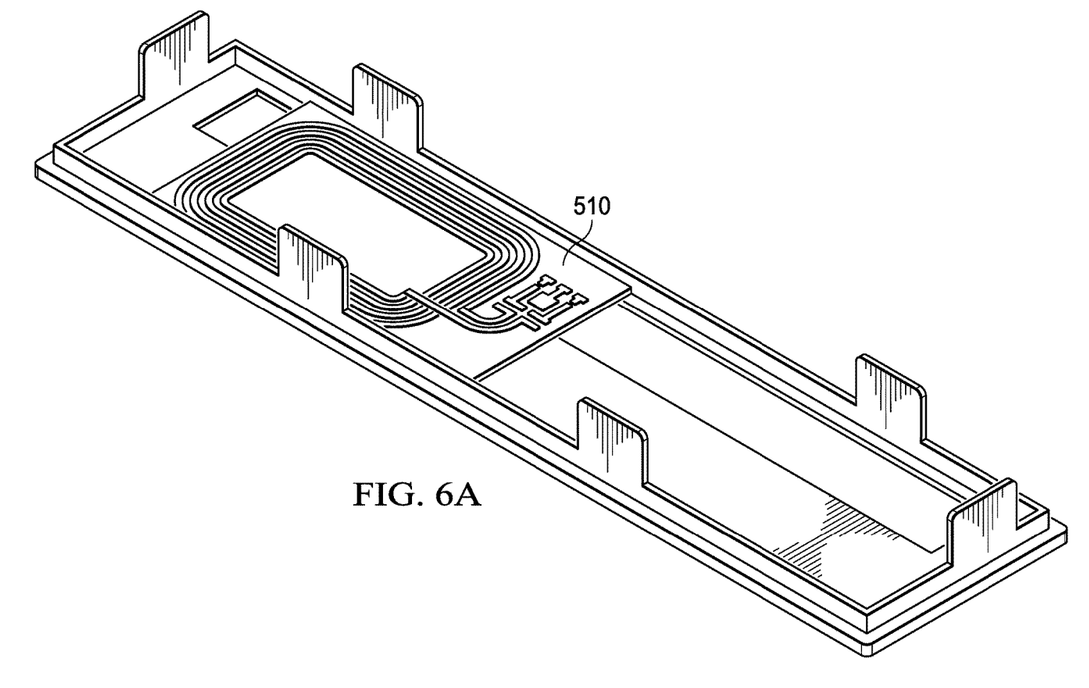
FIGS. 6A and 6B show a top view and a perspective view of a security access device antenna adaption for a half height multi-function component bay.
Figure 6B:
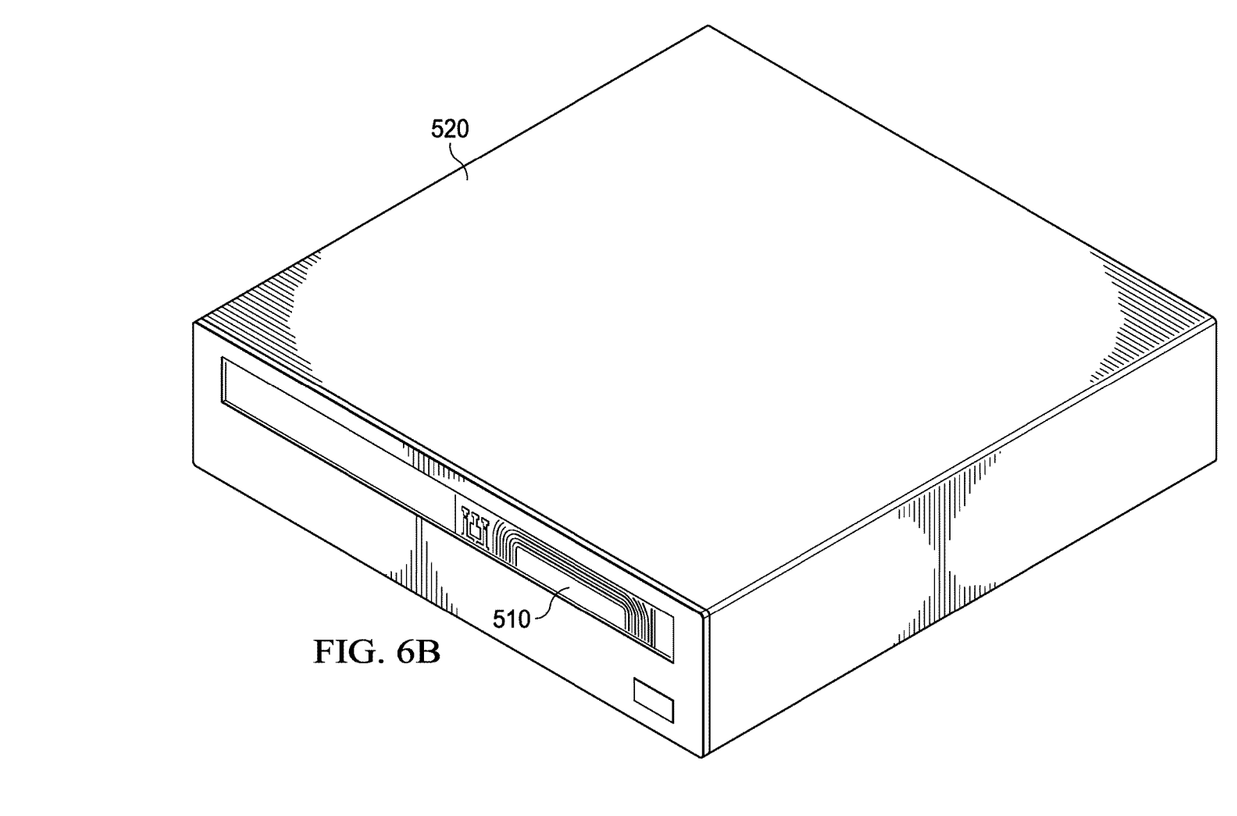

FIG. 4 shows a front view of a security access device enclosure 400. The security access device enclosure 400 includes a contact card portion 410 as well as a card swipe portion 420. The contact card portion 410 includes a slot 430 into which a security card may be inserted. The card swipe portion 420 includes a visual indicia 440 to indicate to a user where a security card may be swiped to perform a security access operation. The card swipe portion 420 includes an alignment feature 450 to facilitate alignment of the security card when performing a security access operation. In certain embodiments, the alignment feature 450 includes either a bar or notch. It will be appreciated that the positions of the various components shown in FIG. 4 are exemplative and may be modified in various other embodiments, FIG. 5 shows a schematic view of a security access device 500 adapted for a half height multi-function component bay. FIGS. 6A and 6B show a top view and a perspective view of a security access device antenna adaption for a half height multi-function component bay. When the security access device 500 is adapted for a component bay other than a slim line component bay (e.g., a half-height multi-function component bay or a FlexBay type component bay), the antenna 510 may be mounted within the security access device enclosure 520 in a front facing orientation (i.e., with the antenna parallel to the front of the enclosure 520. Such an orientation provides a larger antenna area via which a security card may be swiped.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for supporting information handling system wireless security access, comprising:

providing a first wireless security access device within a security access device enclosure, the first wireless security access device being configured to fit within a multi-function information handling system bay;

associating the first wireless security access device with an information handling system by configuring the information handing system to include the first wireless security access device within the multi-function information handling system bay; and, performing a wireless security access operation by moving a second wireless security access device in close proximity with the first wireless security access device; and wherein the first security access device includes a card reader portion and a contactless card reader portion, the card reader portion being configured to receive an inserted security access device and the contactless card reader portion being configured to perform the wireless security access operation, the card reader portion comprising a slot via which the card reader portion can receive the security access device, the slot of the card reader portion and the contactless card reader portion extending across a front portion of the security access device enclosure.

2. The method of claim 1, wherein:
the first security access device includes an antenna portion.

3. The method of claim 2, wherein:
the antenna portion comprises a narrow antenna with one full length side in conjunction with high gain.

4. The method of claim 2, wherein:
the antenna portion comprises an alignment indicia to indicate to a user where a security card may be swiped to perform the wireless security access operation.

5. The method of claim 2, wherein:
the antenna portion comprises a near field communications (NFC) type transmitter within the first security access device.

6. A system comprising:
a processor;
a data bus coupled to the processor; and
a first wireless security access device coupled to the processor, the first wireless security access device being configured to fit within a multi-function information handling system bay, the first wireless security access device enabling performance of a wireless security access operation by moving a second wireless security access device in close proximity with the first wireless security access device; and wherein the first security access device includes a card reader portion and a contactless card reader portion contained within a security access device enclosure, the card reader portion being configured to receive an inserted security access device and the contactless card reader portion being configured to perform the wireless security access operation, the card reader portion comprising a slot via which the card reader portion can receive the security access device, the slot of the card reader portion and the contactless card reader portion extending across a front portion of the security access device enclosure.

7. The system of claim 6, wherein:
the first security access device includes an antenna portion.

8. The system of claim 7, wherein:
the antenna portion comprises a narrow antenna with one full length side in conjunction with high gain.

9. The system of claim 7, wherein:
the antenna portion comprises an alignment indicia to indicate to a user where a security card may be swiped to perform the wireless security access operation.

10. The system of claim 7, wherein:
the antenna portion comprises a near field communications (NFC) type transmitter within the security access device.

* * * * *